April 14, 1931. H. M. PFORSICH 1,800,749
SHOVEL
Filed May 5, 1930
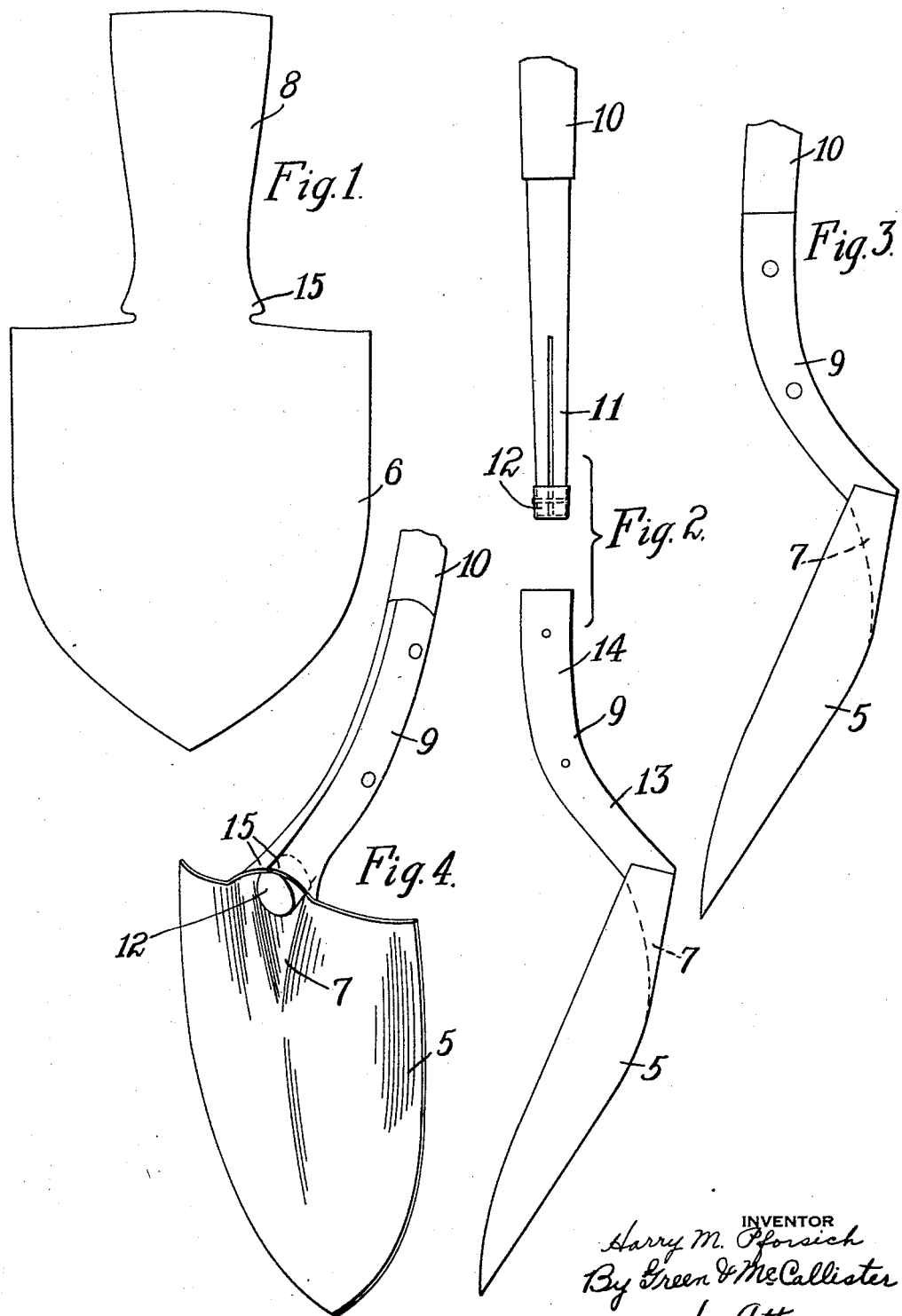
INVENTOR
Harry M. Pforsich
By Green & McCallister
His Attorneys Patented Apr. 14, 1931

1,800,749

UNITED STATES PATENT OFFICE

HARRY M. PFORSICH, OF MONTPELIER, INDIANA, ASSIGNOR TO HUBBARD & COMPANY, A CORPORATION OF PENNSYLVANIA

SHOVEL

Application filed May 5, 1930. Serial No. 450,023.

This invention relates to shovels and more particularly to hollow back shovels such as are commonly formed from pressed steel, and this application is a continuation in part of my previously filed application No. 316,007 of October 30, 1928.

As heretofore constructed, hollow back shovels have been provided with handle receiving sockets of substantially straight tubular construction for receiving the straight end of a shovel handle which extended into the socket up to the bend or curve joining the socket to the shovel blade. As a result, this form of hollow back shovel is very weak at that point where the socket runs into the frog, and at the same time possesses a relatively short lift as compared with the more expensive construction of plain back shovel.

An object of this invention is to provide a hollow back shovel of increased strength and rigidity and having a lift comparable to the lift of a plain back shovel, without increasing the cost of manufacture.

This and other objects which will be apparent to those skilled in this particular art are accomplished by means of the invention illustrated in the accompanying drawings in which Fig. 1 is a view in elevation of a blank from which the shovel blade and frog are pressed. Fig. 2 is a view of the shaped blade and socket showing the associated end of a shovel handle before the two have been joined together. Fig. 3 is a view in side elevation of the blade and socket with the associated end of a handle secured thereto and Fig. 4 is a perspective view of the finished article showing certain details of construction.

The particular embodiment of this invention which has been chosen for the purposes of illustration includes a blade portion 5 of any desired form or shape, formed by pressing the metal of the blank into the desired configuration, the blank 6 having sufficient metal in its upper portion to permit the formation of the frog 7 in the pressing operation without causing any noticeable taper of the blade edges.

As above pointed out, hollow back shovels have, heretofore, been so formed that the handle receiving sockets have extended back from the frog portion in a straight line for the purpose of receiving substantially straight ended handles. This construction has produced an awkward angle between the handle and the shovel blade, giving an insufficient "lift" and rendering the shovel inconvenient to handle and extremely tiring to work with. At the same time the portion of the shovel where the socket rises from the frog has been a point of weakness.

In the illustrated embodiment of the present invention, the blank 6 has an arm 8 extending outwardly from the blade portion, and this arm is pressed around a suitable mandrel so as to provide a curved tubular socket 9 having the configuration illustrated in the drawings. A shovel handle 10 is provided with a split end 11 for the purpose of increasing the flexibility of such end, although it will be apparent that handles of sufficient flexibility may be obtained without necessarily resorting to the splitting thereof. The handle is driven into and through the shovel socket 9 so that it conforms to the curvature of the socket and the end thereof is located substantially flush with the lower end of the socket adjacent the frog of the shovel blade. A wear-resisting metallic ferrule 12 is secured to the lower end of the handle and provides a protecting cover for the projecting end of the handle at the open back of the blade to prevent abrasion of the handle end and to more or less close the bottom end of the socket to prevent the entry of material therein.

The socket 9 includes a portion 13 extending away from the blade 5 and frog 7 at an abrupt angle and this portion is curved into the outer socket portion 14. The entire socket 9 tapers gradually from a comparatively small diameter of neck, adjacent the blade 5, to the larger diameter of the outer socket portion 14.

The blank 6 from which the blade and socket of the one piece shovel is pressed, is sheared or stamped from a flat sheet of metal and is of irregular design as illustrated in Fig. 1 of the drawings.

The blank has ears 15 which cooperate in the finished shovel to extend the closed socket to a position substantially at the back of the blade near the ferrule 12. It will be apparent that the latter also serves to hold the end of the shovel against further splitting when the split end handle is provided.

What I claim as new and desire to secure by Letters Patent is:

1. A hollow back shovel having a curved tubular socket extending upwardly and outwardly from the blade, a handle positioned in said socket and having the end thereof terminating adjacent the lower open end of said socket, means securing said socket and said handle together and a cover for said handle secured to the end thereof and located adjacent the hollow back of the shovel blade.

2. A hollow back shovel having a blade and a curved tubular socket extending upwardly and outwardly from said blade, a handle extending through said curved socket and conforming to the curve thereof and having its end located adjacent the hollow back of said shovel at the lower open end of said socket and a ferrule secured to the end of said handle.

3. The combination of a hollow back shovel having a blade and a curved tubular socket extending upwardly and outwardly from said blade, and a handle extending through said curved socket and conforming to the curve thereof, the lower end of said handle having affixed thereto a protecting and reinforcing ferrule of metal.

In testimony whereof, I have hereunto subscribed my name this 9th day of March, 1929.

HARRY M. PFORSICH.